United States Patent
Deprey et al.

(10) Patent No.: US 9,514,199 B1
(45) Date of Patent: Dec. 6, 2016

(54) SORTING AND PAGINATION OF CONTENT ITEM STREAMS

(71) Applicant: Google Inc., Mountain View, CA (US)

(72) Inventors: Benigne Deprey, Palo Alto, CA (US); Qing Wu, San Mateo, CA (US); Junbin Teng, Cupertino, CA (US); Noah Fiedel, Palo Alto, CA (US); Lan Liu, Sunnyvale, CA (US); Chih-Wei Chen, Sunnyvale, CA (US); Boris Mazniker, San Francisco, CA (US); Lisha Huang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 14/040,476

(22) Filed: Sep. 27, 2013

Related U.S. Application Data

(60) Provisional application No. 61/707,850, filed on Sep. 28, 2012, provisional application No. 61/707,881, filed on Sep. 28, 2012.

(51) Int. Cl.
  *G06F 17/30* (2006.01)
(52) U.S. Cl.
  CPC .............................. *G06F 17/30554* (2013.01)
(58) Field of Classification Search
  CPC .............. G06F 17/277; G06F 17/30353; G06F 17/30554
  USPC ......................................................... 707/736
  See application file for complete search history.

(56) References Cited

U.S. PATENT DOCUMENTS

| | | | |
|---|---|---|---|
| 8,572,091 B1* | 10/2013 | Sivasubramanian et al. | 707/747 |
| 2006/0236224 A1* | 10/2006 | Kuznetsov et al. | 715/513 |
| 2008/0086484 A1* | 4/2008 | Darnell et al. | 707/10 |
| 2008/0086755 A1* | 4/2008 | Darnell et al. | 725/105 |
| 2009/0281791 A1* | 11/2009 | Li | 704/9 |
| 2013/0246334 A1* | 9/2013 | Ahuja et al. | 707/600 |

* cited by examiner

*Primary Examiner* — Hosain Alam
*Assistant Examiner* — Saba Ahmed
(74) *Attorney, Agent, or Firm* — McDermott Will & Emery LLP

(57) ABSTRACT

A system and machine-implemented method including receiving a request for a set of content items within a session, identifying, in response to the request, one or more content items, determining if the session is associated with a continuation token, wherein the continuation token provides information regarding the content items provided for display during the session, generating a continuation token for the session when the session is not associated with a continuation token, providing at least one of the one or more content items for display and updating the continuation token with information regarding the at least one of the one or more content items provided for display and a time stamp.

20 Claims, 5 Drawing Sheets

SORTING AND PAGINATION OF CONTENT ITEM STREAMS

CROSS-REFERENCE TO RELATED APPLICATION

The present application claims the benefit of U.S. Provisional Patent Application Ser. No. 61/707,850, entitled "Arranging Content Items Based on Previous Sessions," filed on Sep. 28, 2012 and claims the benefit of U.S. Provisional Patent Application Ser. No. 61/707,881, entitled "Pagination of Content Item Streams Using Continuation Tokens," filed on Sep. 28, 2012, which are hereby incorporated by reference in their entirety for all purposes.

BACKGROUND

Users, such as when browsing a social networking site, may be presented in a stream of content items for the user's consumption. For example, a user may see a stream of content items containing photos posted by friends or family members, links to stories provided by friends or family members, videos posted for the user, etc. The content items in a stream may be presented in a chronological order, with the latest items displayed before items posted at a later point in time. As streams become larger, a purely chronological stream may not be an optimal stream for user consumption.

Some web-based applications provide information in the form of a stream to be viewed by users. Pagination of streams is accomplished by obtaining the results for a page and all previous pages, and discarding the results from the previous pages. Since streams are continuously populated; however, the content of the stream may change as a user scrolls down to a second page. For example, a new content item may be delivered to the stream when the user scrolls to the second page. Thus a current result of the first page may not resemble the results of a refreshed first page. Diversification processes may also be applied to a stream to modify the order in which the content items appear. While diversification may improve the user experience by prioritizing the display of certain content items in the stream, the diversion from a chronological order presentation as a result of the diversification poses a particular challenge for tracking which content items have been delivered and which have not, particularly when content items are provided for viewing as different pages.

SUMMARY

The disclosed subject matter relates to a machine-implemented method including receiving a request for a set of content items within a session. The method may further include identifying, in response to the request, one or more content items. The method may further include determining if the session is associated with a continuation token, wherein the continuation token provides information regarding the content items provided for display during the session. The method may further include generating a continuation token for the session when the session is not associated with a continuation token. The method may further include providing at least one of the one or more content items for display. The method may further include updating the continuation token with information regarding the at least one of the one or more content items provided for display and a time stamp.

The method may further include processing the continuation token to determine the plurality of content items previously displayed within the session and a time stamp associated with the session. The method may further include selecting the at least one of the one or more content items from the one or more content items by removing any content items of the plurality of content items previously displayed within the session and any content items meeting a condition with respect to a time represented by the time stamp.

The timestamp may indicate a time stamp of the request. The timestamp may indicate a time of the first request within the session. The timestamp may indicate a time of the session being initiated. The information of the continuation token may be generated as filter maintaining data corresponding to the content items identified as having been provided for display within the session. The termination of the session may cause a reset of the continuation token for the session. The session may be terminated when an indication of the user navigating away from a continuous stream displaying the content items of the session. The method may further include storing the information of the continuation token with respect to the session after the session has terminated.

The disclosed subject matter also relates to a machine-readable medium comprising instructions stored therein, which when executed by a system, cause the system to perform operations including receiving a first request within a session for content items. The operations may further include identifying, one or more content items in response to the first request. The operations may further include generating a continuation token for the session. The operations may further include providing the one or more content items for display and updating the continuation token with information regarding the one or more content items provided for display and a time stamp. The timestamp may correspond to a time of the first request.

The operations may further include receiving a subsequent request within the session for content items. The operations may further include identifying a plurality of content items in response to the subsequent request. The operations may further include determining the information regarding the one or more content items and the time stamp from the continuation token. The operations may further include determining if one or more of the plurality of content items are different from the one or more content items and has a time that is before the time stamp, based on the information of the continuation token and providing the one or more of the plurality of content items for display, if the one or more of the plurality of content items are different from the one or more content items and has a time that is before the time stamp, based on the information of the continuation token, in response to the subsequent request.

The operations may further include updating the continuation token with information regarding the one or more of the plurality of content items. The one or more of the plurality of content items provided in response to the subsequent request may represent a subsequent page of a plurality of pages of a stream of content items.

The one or more content items provided in response to the first request may represent a first page of a plurality of pages of a stream of content items. The termination of the session may cause a reset of the continuation token.

In some implementations, providing the one or more content items for display includes arranging the one or more content items into multiple buckets according to state information regarding the one or more content items and a quality score associated with each of the one or more content items and providing the content items in an order according to the an order of each of the multiple buckets, wherein content items within each bucket are provided at once in the order of the bucket.

In some implementations, the state information for each of the content items comprises whether the content item was provided for display within a previous session.

In some implementations, the timestamp may indicate determining whether the content item was displayed in the previous session based on the information of the continuation token of the previous session.

The disclosed subject matter also relates to a system including one or more processors and a machine-readable medium including instructions stored therein, which when executed by the processors, cause the processors to perform operations including receiving a request within a session for content items. The operations may further include identifying, one or more content items in response to the request. The operations may further include determining if the request is associated with a continuation token. The operations may further include providing the one or more content items for display if the request is not associated with a continuation token. The operations may further include. The operations may further include providing one or more of the one or more content items based on the information of the continuation token if the request is associated with a continuation token and updating the continuation token with information regarding the content items provided for display.

Advantageously, the subject technology improves the user experience by providing proper ordering and pagination of content items in a stream. Since streams may be populated in real time (e.g., content items being added each a user makes a posting), record must be kept as to which content items have already populated the stream, which content items have not populated the stream, and which content items have been newly posted since the last request for population of the stream. By maintaining such a record, the stream may be populated in a manner that minimizes inadvertent omission of content items, minimizes repeat posting of the same content item on two or more pages and/or provides predictable ordering of content items provided for display.

In some aspects, the disclosed subject matter relates to a method for ranking or arranging content items in a stream. The method includes a step for receiving a request for content items to be displayed in a stream. The method also includes a step for retrieving a first set of content items for the stream. The method also includes a step for arranging a first bucket of content items from among the first set of content items, wherein a plurality of content items in the first bucket have not been marked as previously viewed by the user and the plurality of content items satisfy a first threshold quality score. The method also includes a step for arranging a second bucket of content items from among the first set of content items, wherein a plurality of content items in the second bucket have been marked as previously viewed by the user. The method also includes a step for providing the first bucket of content items and the second bucket of content items for display in the stream. Other aspects can include corresponding systems, apparatus and computer program products.

These and other aspects can provide one or more of the following features. The first bucket of content items may be displayed in the stream before the second bucket of content items are displayed in the stream. Content items in the first bucket may be arranged to be displayed in a position among the remaining content items of the first bucket based on the quality score of the content item. Content items in the second bucket may be arranged to be displayed among the remaining content items in the second bucket based on a position associated with the content item. The first bucket may contain a first number of unread items, wherein the first number of unread items may be based on past usage history of the user, or based on a current time of day, or based on a current day of the week, or based on some combination thereof.

These and other aspects can provide one or more of the following features. A third bucket of content items may be arranged, and provided for display in the stream, from among the first set of content items, wherein each content item in the third bucket are content items from the first set of content items that have not been arranged in the first and second buckets of content items. Content items in the second bucket may be displayed before content items in the third bucket. Content items in the third bucket may be arranged to be displayed in a position based on the quality score of the content item as compared to the quality score of other content items in the third bucket.

These and other aspects can provide one or more of the following features. The first set of content items retrieved may be for a first time frame, and a second set of content items for a second time frame may be retrieved for the stream. The steps of arranging the first bucket, the second bucket, and the third bucket may be repeated for the retrieved second set of content items. The first, second, and third buckets of content items for the second set of content items may be provided for display in the stream. The first time frame may be a twenty four hour time frame from a current time of the request or may be the current day plus an additional twenty four hours prior to the current day. The second time frame may be a twenty four hour time frame prior to the first time frame. The first, second, and third buckets of content items for the first set of content items may be displayed before the first, second, and third buckets of content items for the second set of content items.

These and other aspects can provide one or more of the following features. The quality score for each content item may be based on one or more of a timestamp of receipt of the content item, a source of the content item, a number of comments provided for the content item, one or more sources of the comments provided for the content item, a relationship between the user and source of the content item. The quality score may be further based on a diversification score applied to the first set of content items.

The disclosed subject matter also relates to a machine-readable medium. The computer-readable medium includes instructions that when executed by a computer, cause the computer to implement a method for arranging content items in a stream. The instructions include code for receiving a request for content items to be displayed in a social networking stream. The instructions also include code for retrieving a first set of posts for the stream. The instructions also include code for arranging a first bucket of posts from among the first set posts, wherein each post in the first bucket has not been marked as previously viewed by the user and has at least a first threshold quality score. The instructions also include code for arranging a second bucket of content items from among the first set of posts, wherein each post in the second bucket has been marked as previously viewed by the user. The instructions also include code for arranging a third bucket of posts from among the first set of posts, wherein each post in the third bucket are posts from the first set of posts that have not been arranged in the first and second buckets of posts. The instructions also include code for providing the first, second, and third buckets of posts for display in the stream. Other aspects can include corresponding systems, apparatus and computer program products.

The disclosed subject matter further relates to a system. The system includes one or more processors. The system also includes a memory, the memory having instructions which, when executed by the one or more processors, cause the one or more processors to implement a method for arranging content items. The instructions include code for receiving a request for content items to be displayed in a stream. The instructions also include code for retrieving content items for the stream. The instructions also include code for arranging a first bucket of content items from among the retrieved content items, wherein a plurality of content items in the first bucket are unread by the user and the plurality of content items satisfy a first threshold quality score. The instructions also include code for arranging a second bucket of content items from among the retrieved content items, wherein a plurality of content items in the second bucket have been marked as previously read by the user. The instructions also include code for providing the first bucket of content items and the second bucket of content items for display in the stream. The first quality threshold score may be satisfied by the plurality of content items in the first bucket having a quality scored that is greater than the first threshold quality scored. Other aspects can include corresponding systems, apparatus and computer program products.

In one innovative aspect, the disclosed subject matter can be embodied in a method. The method comprises receiving a first request for a first set of the content items. In response to the first request, the first set of content items to be provided for display may be retrieved. The retrieved first set of the content items and a continuation token corresponding to the first request are served, wherein the continuation token comprises information on the first set of the content items and a time stamp corresponding to a time of the first request.

These and other embodiments can comprise one or more of the following features. The method may further comprise receiving a second request for a second set of the content items, the second request including the continuation token. In response to the second request, the second set of content items to be provided for display may be retrieved. The information on the first set of the content items located on the continuation token may be processed to identify which content items were served in the first set.

The time stamp from the continuation token that corresponds to the time of the first request may be processed to determine which content items have time stamps later than the time of the first request. The second set of content items may be filtered to remove the content items identified as having been served in the first set, and to remove the content items identified as having time stamps later than the time of the first request. The filtered second set of the content items and an updated continuation token are then served to the requesting browser. The updated continuation token may include information on the second set of the content items. The first set of the content items represents a first of several pages of the content items, and the second set of the content items represents a second of several pages of the content items. The first page and the second page of the content items represent consecutive sections of the content items in a continuous stream of the content items.

The request for the first set of the content items may be received in response to a user's initial navigation to the continuous stream of the content items. The request for the second set of the content items may be received in response to a received indication of a user scrolling down the continuous stream of the content items. The request for the second set of the content items may be initiated by an indication of the user scrolling to the end of a section of the continuous stream of the content items that correspond to the first set of the content items served. The information on the first and second sets of the content items included in the continuation token correspond to a filter, wherein the Bloom filter maintains data corresponding to the content items identified as having been served in the first set. A termination of the browsing session causes a reset of the continuation token, the browsing session being terminated when an indication of the user navigating away from the continuous stream may be received.

In another innovative aspect, the disclosed subject matter can be embodied in a machine-readable medium. The machine-readable medium comprises instructions stored therein, which when executed by a system, cause the system to perform operations comprising receiving a first request for a first set of the content items. In response to the first request, the first set of content items to be provided for display may be retrieved. The retrieved first set of the content items and a continuation token corresponding to the first request are served, wherein the continuation token comprises information on the first set of the content items and a time stamp corresponding to a time of the first request.

A second request for a second set of the content items may be received, the second request including the continuation token. In response to the second request, the second set of content items to be provided for display may be retrieved. The information on the first set of the content items located on the continuation token may be processed to identify which content items were served in the first set. The time stamp from the continuation token that corresponds to the time of the first request may be processed to determine which content items have time stamps later than the time of the first request. The second set of content items may be filtered to remove the content items identified as having been served in the first set, and to remove the content items identified as having time stamps later than the time of the first request. The filtered second set of the content items and an updated continuation token are then served to the requesting browser.

These and other embodiments can include one or more of the following features. The updated continuation token may include information on the second set of the content items. The first set of the content items represents a first of several pages of the content items, and the second set of the content items represents a second of several pages of the content items. The first page and the second page of the content items represent consecutive sections of the content items in a continuous stream of the content items. The request for the second set of the content items may be received in response to a received indication of a user scrolling down the continuous stream of the content items. The request for the second set of the content items may be initiated by an indication of the user scrolling to the end of a section of the continuous stream of the content items that correspond to the first set of the content items served.

The information on the first and second sets of the content items included in the continuation token may correspond to one of a Bloom filter or a list of fingerprints of unique features of the content items. The Bloom filter may maintain data corresponding to the content items identified as having been served in the first set. A termination of the browsing session causes a reset of the continuation token. The browsing session may be terminated when an indication of the user navigating away from the continuous stream may be received.

In another innovative aspect, the disclosed subject matter can be embodied in a system. The system comprises one or more processors, and a machine-readable medium comprising instructions stored therein, which when executed by the processors, cause the processors to perform operations comprising receiving a first request for a first set of the content items. In response to the first request, the first set of content items to be provided for display may be retrieved, the retrieved first set of content items being arranged in a priority queue. A set of characteristics of the first set of content items on which the arrangement of the priority queue may be based may be identified. A continuation token may be selected from a set of continuation tokens to use based on the identified set of characteristics. The first set of the content items and the selected continuation token are served, wherein the selected continuation token comprises information on at least the first set of the content items or a time stamp corresponding to a time of the first request.

These and other embodiments can include one or more of the following features. A continuation token with a corresponding time stamp may be selected when the identified set of characteristics on which the arrangement of the priority queue may be based may be time dependent. Alternatively, a continuation token with one of a Bloom filter or a list of fingerprints of unique features of the content items may be selected when the identified set of characteristics on which the arrangement of the priority queue may be based may not be time dependent. The machine-readable medium may further comprise instructions for receiving a second request for a second set of the content items, the second request including the selected continuation token. In response to the second request, the second set of content items to be provided for display may be retrieved. The second set of content items may be filtered based on the selected continuation token. The filtered second set of the content items and an updated continuation token are served.

In another innovative aspect, the disclosed subject matter can be embodied in a method. The method comprises receiving a first request for a first set of the content items. In response to the first request, the first set of content items to be provided for display may be retrieved. The retrieved first set of the content items and a continuation token corresponding to the first request are served.

These and other embodiments can include one or more of the following features. The continuation token may comprise information on the first set of the content items and a time stamp corresponding to a time of the first request.

In another innovative aspect, the disclosed subject matter can be embodied in a machine-readable medium. The machine-readable medium comprises instructions stored therein, which when executed by a system, cause the system to perform operations comprising receiving a first request for a first set of the content items. In response to the first request, the first set of content items to be provided for display may be retrieved. The retrieved first set of the content items and a continuation token corresponding to the first request are served. A second request for a second set of the content items may be received. In response to the second request, the second set of content items to be provided for display may be retrieved. The information on the first set of the content items located on the continuation token may be processed. The time stamp from the continuation token that corresponds to the time of the first request may also be processed. The second set of content items may be filtered. The filtered second set of the content items and an updated continuation token are then served to the requesting browser.

These and other embodiments can include one or more of the following features. The continuation token may comprise information on the first set of the content items, and a time stamp corresponding to a time of the first request. The second request includes the continuation token. The information on the first set of the content items may be processed to identify which content items were served in the first set. The time stamp corresponding to the time of the first request may be processed to determine which content items have time stamps later than the time of the first request. The second set of content items may be filtered to remove the content items identified as having been served in the first set and to remove the content items identified as having time stamps later than the time of the first request.

In another innovative aspect, the disclosed subject matter can be embodied in a system. The system comprises one or more processors, and a machine-readable medium comprising instructions stored therein, which when executed by the processors, cause the processors to perform operations comprising receiving a first request for a first set of the content items. In response to the first request, the first set of content items to be provided for display may be retrieved. A set of characteristics of the first set of content items may be identified. A continuation token may be selected from a set of continuation tokens. The first set of the content items and the selected continuation token are served.

These and other embodiments can include one or more of the following features. The retrieved first set of content items may be arranged in a priority queue. The set of characteristics identified may be characteristics on which the arrangement of the priority queue may be based. The continuation token may be selected based on the identified set of characteristics. The selected continuation token comprises information on at least the first set of the content items or a time stamp corresponding to a time of the first request.

Advantageously, the subject technology improves the user experience by providing proper pagination of content items in a stream. Since streams may be populated in real time (e.g., content items being added each a user makes a posting), record must be kept as to which content items have already populated the stream, which content items have not populated the stream, and which content items have been newly posted since the last request for population of the stream. By maintaining such a record, the stream may be populated in a manner that minimizes inadvertent omission of posts and that minimizes repeat posting of the same content item on two or more pages.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
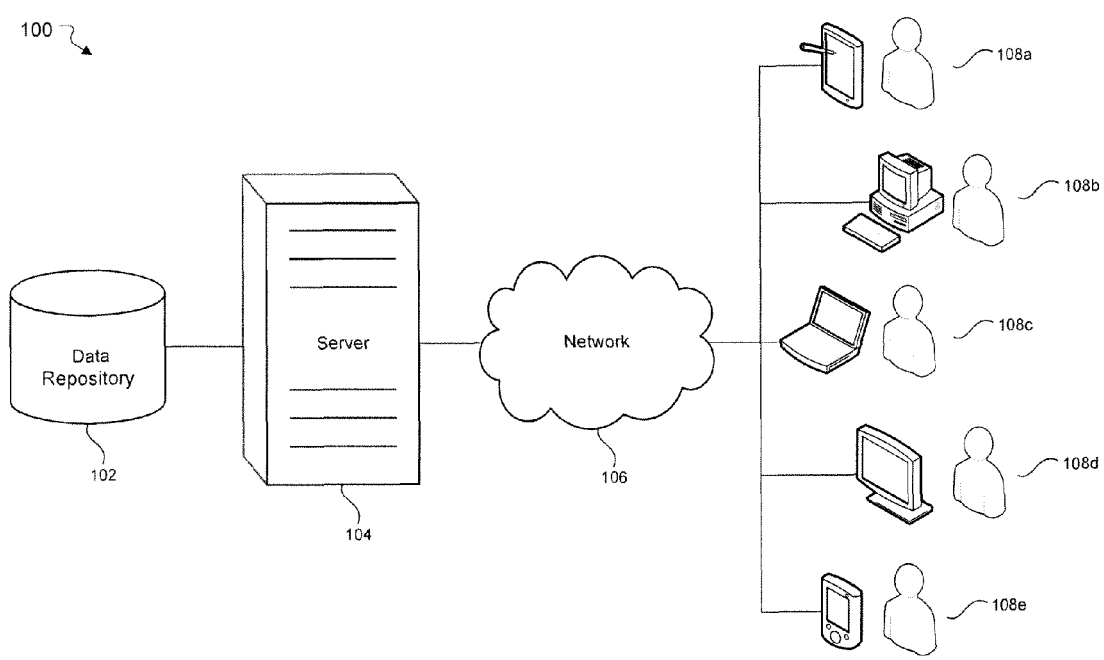
FIG. 1 illustrates an example network environment for sorting and/or paginating content items provided for display in a content stream.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Content items being provided for display to a user may be ranked to provide the user with the most interesting content on top of the list to ensure both quality and longevity of user experience at a service. For example, content items provided to a user in response to a request (e.g., user request, search request, user logging into a system), may be ranked and presented to the user according to the ranking. For example, items may be provided for display to a user in a stream (e.g., at a social networking service), when the user views the user's default login stream or a stream associated with a profile of a member or a group of an application or service (e.g., social networking service).

In some implementations, the stream of the multiple content items is ranked chronologically, so that the user views newer content items before or above older content items. However, the newest content items may not necessarily be the most interesting content items to the user. Also, content items that the user has already viewed may be interleaved with content items that the user has not yet viewed, confusing the user.

Users expect the ranking of content items in the stream to be stable (i.e., if a first content item appears before a second content item during a first session of the user in the social networking service, the user expects the first content item to appear before the second content item during a subsequent session). The subject technology provides techniques for ranking content items in a content stream (e.g., a search result listing and/or stream at a social networking service). The content items may include posts, geographic check-ins, images, videos, or any other content provided by users to a social networking service. For example purposes, the subject technology is described herein in conjunction with a social networking service. It should be apparent to one of ordinary skill in the art that the subject technology may be used in conjunction with any service or application providing content for display to the user, for example, in the form of a list, feed and/or stream (e.g., a channel subscription service, a search service, a media repository and/or sharing service and/or a newspaper service).

In various aspects, content items identified for display to a user are placed into multiple buckets, taking into account the different consideration regarding continuity, immediacy, importance and/or quality of the content items. In some example implementations, the systems generates buckets for organizing items according to various criteria, including, but not limited to, a quality score for an item, and/or whether the item has been previously provided for display to the user. In one example, a quality score is determined based on one or more criteria including characteristics of the item (e.g., content type, content importance, content quality), characteristics of the author of the item (e.g., affinity with the user, popularity, expertise) and/or immediacy of the item (e.g., the time associated with the item in relation to one or more other items and/or a benchmark such as current time, current geographic location, etc.).

The items within each bucket may further be sorted according to one or more criteria (e.g., quality score, immediacy, etc.). In one example, the items within each bucket are presented to the user at once, before and/or after items within another bucket. In another example, a specific number of items within each bucket are selected and presented to the user, in a bucket order (e.g., first items from a first bucket are presented, next items from another bucket, and so forth).

Furthermore, the system may provide a repeated set of the buckets, by some other criteria (e.g., time, immediacy, importance, etc.). For example, bucket sets may be created for different ranges (e.g., a distance-based range such as a time period, or a geographic area) and presented in order in sets, with a first set being presented first, in bucket order, a second set being presented second in a bucket order and so forth.

In one example implementation, a first set of buckets is generated, with three buckets. A collection of items having quality scores above a threshold score and/or being ranked above a specific rank (e.g., based on a limitation of number of items within the bucket) that were not previously provided for display to the user are placed within a first bucket. A second bucket may contain the remaining unread items, while a third bucket may be generated for the items previously presented for display to the user. For example, in one example, the user is presented with more interesting, unread content items at the very top of a stream (for quick consumption), then with content items marked as read (to maintain continuity of items that they have possibly seen in previous sessions), and then the remaining bucket of items (likely of lower interest to the user).

In one example, the information regarding whether an item has previously been displayed to a user may be accessible through various means such as a listing of all previously displayed items, a tag associated with each item already provided for display. In one example, a continuity token may be updated each time items are provided for display to a user (e.g., in a single session or across multiple session). In such examples, the information stored with respect to continuity token(s) may be used to determine items previously provided for display to a user.

A continuation token is used to keep track of the sets of content items served to a stream of an application (e.g., social networking service). A continuation token may be generated for each single session and/or across multiple sessions. The continuation token may be updated based on the content items that are provided to a user (e.g., in a single session or across multiple sessions).

In one example, continuation tokens may be used for paginating content streams. Upon receiving a request to provide contents a user, a set of content is identified and provided for display to a user (e.g., according to a specific ordering). In some implementations, a continuation token corresponding to the first request is generated. The continuation token comprises information on the first set of the content items and a time stamp (e.g., corresponding to the time of the request, initiation of the session, and/or other benchmark time). When additional items are to be displayed to the user, the items are identified, and filtered according to the continuation token, which contains information regarding the time of the request and/or the content items provided to the user. In one example, the content items provided for display in response to the additional request may for example include items not previously presented to the user (e.g., those items identified in response to the continuation token) and/or items that are generated or are associated with a time (e.g., a time stamp) before the time associated with the continuation token.

FIG. 1 illustrates an example network environment for sorting and/or paginating content items provided for display in a content stream. Network environment 100 includes a data repository 102 (e.g., computer-readable storage media) for storing a variety of data accessed by client applications (e.g., web-based or device-based applications). While network environment 100 includes a single data repository 102 in FIG. 1, the network environment may include additional data repositories in some implementations. Data repository 102 may store information related to the web-based application including content items that are retrieved for displaying on a stream on the web-based application.

Network environment 100 further includes server 104. While network environment 100 includes a single server in FIG. 1, the network environment may include several interconnected servers in some implementations. Server 104 may receive requests from user-operated client devices 108a-108e. Server 104 and client devices 108a-108e may be communicatively coupled through a network 106. In some implementations, client devices 108a-108e may request data from server 104. Upon receiving an indication of a request from an application via any of the client devices 108a-108e (e.g., through an application installed at the client device and/or a browser at the client device), server 104 may retrieve a set of data (e.g., the content items for populating streams) from data repository 102 and serve the set of data to client devices 108a-108e.

Server 104 may include one or more modules for facilitating user interaction with the web-based application via a browser or a special purpose application executing on client devices 108a-108e or for processing data stored in data repository 102. Server 104 may be implemented as a single machine with a single processor, a multi-processor machine, or a server farm including multiple machines with multiple processors. One example of the server 104 is described in more detail in conjunction with FIG. 2 below.

Each of client devices 108a-108e represents various forms of processing devices. Examples of a processing device include a desktop computer, a laptop computer, a handheld computer, a television coupled to a processor or having a processor embedded therein, a personal digital assistant (PDA), a network appliance, a camera, a smart phone, a media player, a navigation device, an email device, a game console, or a combination of any these data processing devices or other data processing devices.

Each of client devices 108a-108e may be any system or device having a processor, a memory, and communications capability for providing content to the electronic devices. In some example aspects, server 104 can be a single computing device, for example, a computer server. In other embodiments, server 104 can represent more than one computing device working together to perform the actions of a server computer (e.g., cloud computing). Furthermore, server 104 can represent various forms of servers including, but not limited to a web server, an application server, a proxy server, a network server, or a server farm.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, Wifi, or other such transceiver.

In some aspects, network environment 100 can be a distributed client/server system that spans one or more networks such as network 106. Network 106 can be a large computer network, including a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

In example aspects, server 104 of a web-based application may receive content items to be served to an application running on a client device (e.g., through an application at the client device and/or a browser at the client device). The server 104, in one example, is configured to sort the content items and place the content items into several buckets. The sorting may be performed at the time of the request and/or at any time prior to the request. The server 104 is configured to provide one or more items for display to the user. In some implementations, the server 104 is configured to include a continuation token with items being provided for display to the user, the continuation token providing information regarding the items provided for display and/or a time stamp associated with the items provided for display. In one implementation, server 104 is configured to provide pagination of content items being provided for display within a stream, using the continuation token.

In one example, state information, e.g., information regarding which content has been previously displayed to a user and/or viewed by the using, including, in one example, continuation tokens for one or more sessions, may be stored at the data repository 102. In another example, such information may be stored at a separate data repository in communication with data repository 102 and/or server 104. In some example, the server 104 may further host one or more social networking services, and/or other applications (e.g., content sharing applications, feeds, search engines), where content items are generated and/or provided for display to the user, for example, in the stream generated by server 104. In another example, the one or more applications may be hosted at one or more remote servers, communicationally coupled to server 104, for example, through network 106.

Figure 2:
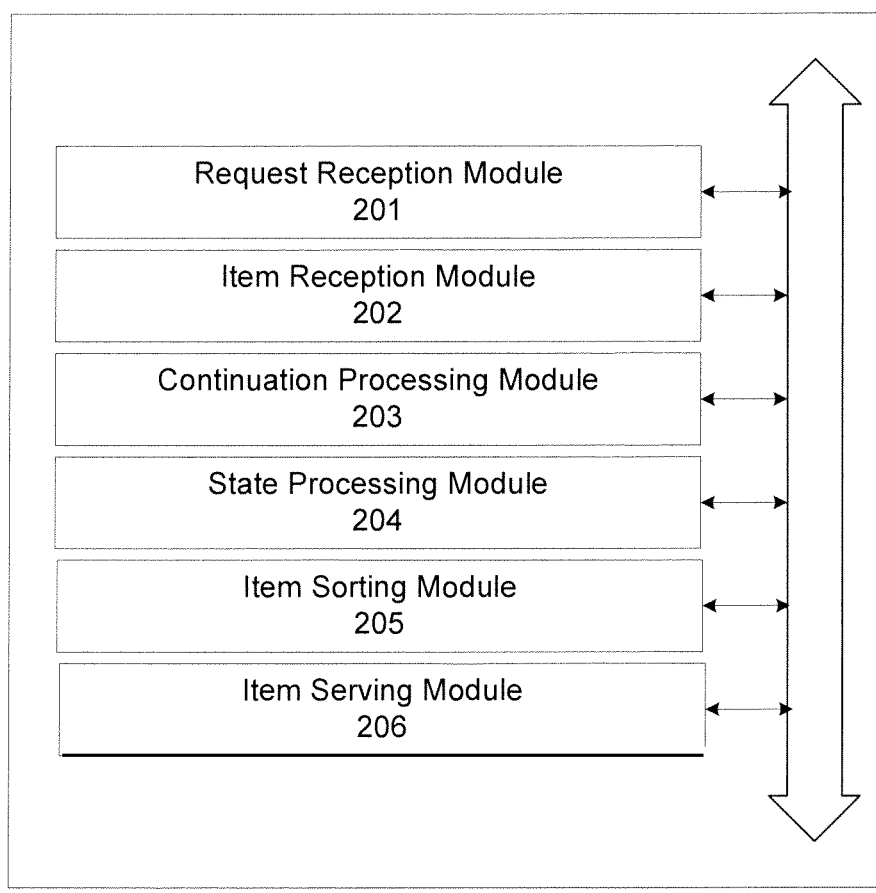
FIG. 2 illustrates an example of a server system for providing content items for display in an information stream.

FIG. 2 illustrates an example of a server system for providing content items for display in an information stream. System 200 includes request reception module 201, item reception module 202, continuation processing module 203, state processing module 204, item sorting module 205, and item serving module 206. In one example, these modules, which are in communication with one another, process items and/or information from one or more data stores (e.g., data repository 102) to facilitate providing one or more items for display to the user.

For example, in one embodiment, upon receiving a request at the request reception module 201 to provide one or more items for display to the user within a stream and/or to generate a stream of items for display to the user (e.g., when a user logs into or otherwise initiates a session at an application, and/or otherwise requests to view one or more items and/or a feed at the application), item reception module 202 retrieves one or more content items (e.g., items meeting the request of the user and/or visible to the user according to privacy settings of one or more users).

In one example, the continuation processing module 203 generates and/or updates a continuation token for a session. In one example, the continuation processing module determines if a continuation token exists for a specific session in response to a request, if one does exist, continuation token processing module may analyze the continuation token to determine what content items have been provided for display. The information may allow the item sorting module to determine how to provide items for display to the user.

In one example, the state processing module 204 determines if an item has been previously provided for display in a session or across multiple sessions. In one example, items provided for display within the same session may be ignored and not provided for display. In one example, items previously provided for display (e.g., across one or more previous sessions) are marked as previously displayed, and provided to the item sorting module 205 for sorting.

The item sorting module 205 is configured, in some examples, to receive the content items and generate one or more buckets, sorting the items into a specific bucket. In one example, multiple content item buckets are generated and the items are placed within the item buckets according state information (e.g., state information providing by the state processing module, indicating whether the item has been previously provided for display and/or viewed by the user) and/or the quality score of the items. In one example, only items provided for display and/or viewed in a session other than the current session are placed within buckets. In some examples, items provided for display within the same session (e.g., in a previous page or request) may not be displayed. In some example, the item sorting module is further configured to determine an order in which items are displayed (e.g., as a single list, and/or within multiple buckets).

Item serving module 206 may serve the appropriate content items to the requesting application. In one example, the item serving module 206 may receive an ordering of items from the item sorting module 205 and may provide the items according to the sorting. In one example, items provided for display in the same session, and/or items generated after the time of the initiation of the session may not be provided for display. In one example, the continuation token for a session provides information regarding the time the session was initiated and/or items previously provided during the session. In one example, a session may refer to an entire session at the application and/or each time a new stream is generated for the user (e.g., in response to the user leaving a page and reentering the page, or refreshing the page).

In one example, the item sorting module is configured to provide the items according to the buckets they are placed in, and/or according to an order based on various criteria (e.g., immediacy, quality, etc.). In one example, once items are provided by the item serving module 206, continuation processing module 203 may update the continuation token for the session to reflect the content items that have been served for that session. In one example, if a session is not associated with a continuation token, the continuation processing module 203 may generate a continuation token for the session and update the continuation token to include all of the items for the session.

In some aspects, the modules may be implemented in software (e.g., subroutines and code). The software implementation of the modules may operate on server 104. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
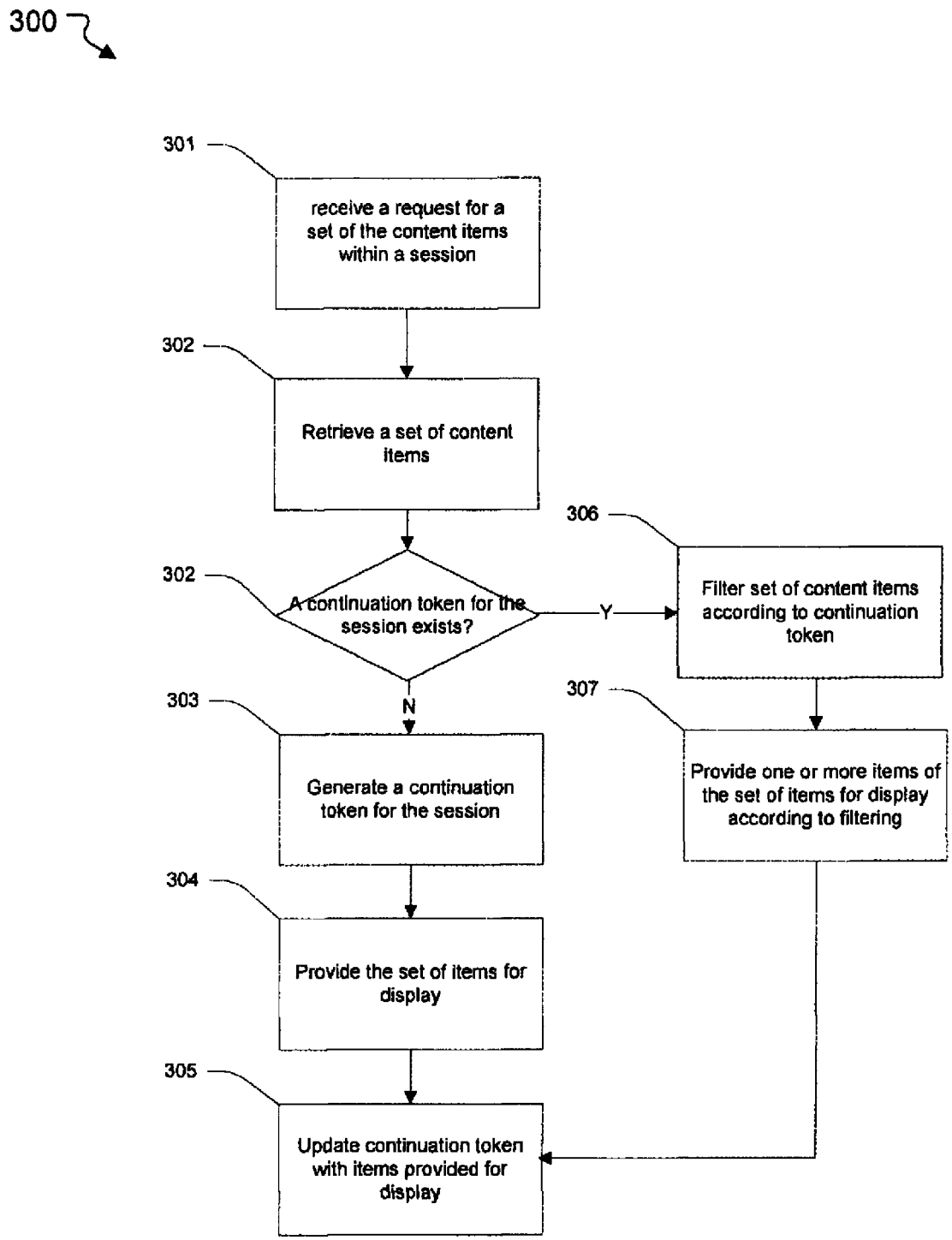
FIG. 3 illustrates a flow diagram of an example process for paginating content items provided for display to a user.

FIG. 3 illustrates a flow diagram of an example process 300 for paginating content items provided for display to a user. In step 301, a first request for a first set of content items is received. The request for the first set of content items may correspond to a user initiating an application session, or taking other action providing an indication of a request to view one or more content items. The application may present content items in a manner where content items are provided one page at a time. Thus, a specific number of items corresponding to items that fit within a viewable portion on a screen and/or a page may be provided for display in response to the request. In another example, a specific number of items determined as the best items for the user until the user requests to see more items. Accordingly, each subsequent request may be represented by a next set of content items (e.g., a specific number or dynamic number of items).

In step 302, a set of content items is retrieved in response to the first request. Each of the content items may have a priority score (e.g., based on quality and/or immediacy of the item) that determines the order in which the content items appears in a stream (e.g., web-based application stream). Priority scores may be determined based on certain characteristics of the content item that make the content item of interest to a user.

In step 303, it is determined if the session is associated with a continuation token. In one example, the request received in step 301 includes a continuation token. In some implementations, the request includes information identifying the session. In one example, the information may be used to determine if the session is associated with a continuation token.

In some implementations, the continuation token includes information on the all content items provided for display in response to one or more requests in a session. In some aspects, the continuation token may include a time stamp. The time stamp may correspond to a time of the first request, the time of one or more subsequent requests, and/or the time at which the session initiated, and/or terminated.

If a continuation token for the session does not exist, according to the determination in step 302, indicating that this is the first request for the session, in step 303, a continuation token is generated for the session. In one example, the continuation token persists throughout the entire session and include information regarding items provided for display during the session. In one example, termination of the session causes a reset of the continuation token for the session. In one example, the session is terminated when an indication of the user navigating away from a continuous stream displaying the content items of the session and/or perform other action(s) indicating that the user is no longer viewing the information stream and/or has requested a new stream.

In step 304, the retrieved first set of content items may be provided for display to the user. As described above, the first set of content items may correspond to a first page that includes a fixed number of content items. In another example, the first set of items corresponds to items provided to the user in response to a request prior to the user requesting to view more content items. In one example, the number of items within the first set of items may be a fixed pre-defined number (e.g., based on system or user settings, display settings, or user preferences) and/or a dynamic number determined at the time of the request (e.g., a number of items that would fill a certain page, or based on user request).

In step 305, the continuation token corresponding to the session is updated with information regarding the items provided for display. In one example, the continuation token may be updated to include identifiers for the items in the first set of items. In some examples, the time associated with the continuation token may also be updated in step 305. In one example, the time associated with the continuation token may be fixed at the initiation time for the session, while in other aspects the time is updated with each subsequent request.

If, in step 302, it is determined that the session is associated with a continuation token, the continuation token is processed, and, in step 306, the set of content items is filtered according to the information of the continuation token. In one example, during step 306, content items that have already been provided for display are identified and omitted from the list of available items. In some implementations, the continuation token includes information on the all content items provided for display during the session.

In order to reduce the amount of storage space occupied, the list of content items may be kept as fingerprints of unique features of each the content items. The list may later be utilized to identify content items that were provided for display during the session or during subsequent sessions. For example, content items may be compared to the list of fingerprints to determine if there are any matches. If a match is found, then the content item is determined to have been previously provided for display.

Alternatively, a filter may be generated according to the information represented by the continuation token (e.g., a Bloom filter that includes probabilistic data structure that is used to test whether an element is a member of a set). The information, when kept as a filter, may similarly be used to identify which content items have been previously provided for display in a single session and/or across multiple sessions. When a content item is processed by the filter, an indication of whether the content item is a member of the list (e.g., corresponds to a content item that was previously served to the browser) may be returned.

Content items that are determined to have been previously served (either by the list of fingerprints or by the filter) may be filtered out so that those content items are not served to the browser a second time (and thus, causing a duplicate to be displayed) within the same session. In some examples, the information regarding previously displayed content items may be used to determine how to sort items for display within a stream (e.g., in a subsequent session).

In some aspects, the continuation token may include a time stamp corresponding to a time of the first request (or the time at which the session initiated). In one example, the time stamp of the continuation token is compared against the time stamp of the remaining items to identify items that became available for display after the last request, after the first request in the session and/or after the session was initiated.

Since streams are continuously populated, and the content items of the stream may change in the time a user scrolls down to a second or later page, the time stamp may be used to determine which content items were available at the time of the first request. By making this determination, content items that are posted subsequent to the first request may, in some examples, be omitted from being displayed in subsequent requests within the same session. The subsequently posted content item may be identified simply by comparing the time stamp of the subsequent content item to the time stamp corresponding to the first request. In one example, if the item has a time stamp that is after the time stamp of the continuation token, the item is not provided for display.

In step 307, one or more items are selected from the remaining available content items and provided for display. The number of items provided for display may be determined in the same manner as described above with respect to the same request. The process then continues to step 305 and updates the continuation token as described above.

While the content items may be defined as populating different pages of the stream, the stream may be represented as a single continuous page of content items. Accordingly, the pages may represent different sections of the stream. As described above, a page may be designated by a fixed number of content items (e.g., 10 content items). In some example implementations, as a user proceeds to scroll down the stream, requests for subsequent pages corresponding to subsequent sections of content items may be received. For example, scrolling from the 10th to the 11th content item may prompt a request for a second page of content items. Since the individual pages are presented as a single continuous page, having a content item on an earlier page repeated in a subsequent page may lessen the user experience. Similarly, having a newly posted content item appear on a latter page of the stream may create a discontinuity in the order of the stream. Thus, the use of a continuation token to provide.

In some implementations, the information stored within the continuation tokens may be customized depending on the characteristics of the feed. For example, if the content items are ordered and/or provided in reverse chronological order the continuation token may include a time stamp that is resettable after each request is served. In this use case, the time stamp may be reset to the time of the last (e.g., least recent in chronology) content item served to the browser. Thus, if 10 content items are being served in response to a first request, the time stamp in the continuation token will be set to the time stamp of the 10th content item. In subsequent requests, the continuation token may be processed to retrieve the time stamp. A second set of content items provided in this case will be the next 10 most recently time stamped content items that are earlier in time than time than indicated by the time stamp of the continuation token.

In one example, where a stream is not updated in real time, the continuation token may not keep track of the time stamp since no new content items are introduced in this use case, and thus there is no risk of a recent content item appearing on a latter page of the stream. In another example, the ranking of items may be according to other criteria including other distance-based criteria providing an indication of immediacy, such as geographic location. In such examples, benchmark indicators in addition or in lieu of the time stamp may be provided with the continuation token.

Adjusting the continuation token according to the use case may help reduce the amount of computations necessary when providing content items for display, and thus may improve the user experience.

Figure 4:
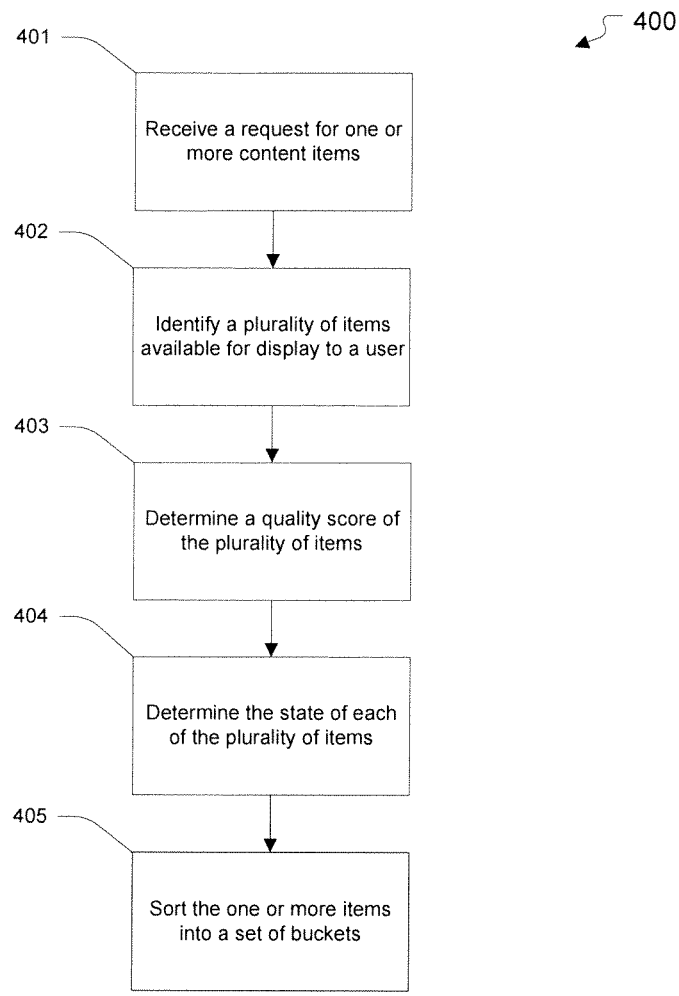
FIG. 4 illustrates a flow diagram of an example process for ordering content items for display using buckets.

FIG. 4 illustrates a flow diagram of an example process 400 for ordering content items for display using buckets. The processes may be performed, for example, by a system such as the system 100 described for FIG. 1. In other examples, the processes may be performed by another system, or combination of systems.

In step 401, a request for content items is received. For example, a user may log into or otherwise initiate an application, enter a page, or otherwise perform an action that indicates a request to provide content items for display to the user (e.g., in a stream or feed).

In step 402, a plurality of items available for display to a user are identified. In one example, the items may comprise posts or other user-generated content at one or more applications or services (e.g., social networking service or media sharing application). In one example, the content items are stored at one or more data repositories. In one example, the data repositories are accessed and items available for display to the user are identified. In one example, a content item is determined to be available for display to the user if the user has the right permissions to view the item (e.g., given permission by author, system administrator, etc.), and/or the item meets any user criteria for items to be displayed to the user. In one example, the request may include one or more criteria (e.g., search terms, key words, preferences, or other search criteria). In one example, the plurality of items identified in step 402 include items meeting one or more criteria associated with the request.

In step 403, a quality score is determined for each content item retrieved in step 402. In some aspects, a quality score may be previously calculated for each item and available for retrieval. In another example, item characteristics and/or user characteristics are determined and used to calculate a quality score for the item. In some examples, the quality score is a measure of how interesting and/or important a content item is likely to be to the user. In one example, the quality score is determined based on various criteria, including, but not limited to the author of the content item, a number of times the specific content item has been accessed and/or viewed, a number of comments and/or other social interaction associated with the specific content item, the source of the comments, the affinity (e.g., relationship strength and immediacy) between the user requesting the content item, the author of the content item, and/or sources of the comments or other social interaction with the post, and/or a timestamp associated with the specific content item.

For example, content posted by members in whom the user is interested (e.g., the user's close friends or close family members) may have a higher quality score than content posted by other members of the user's social circles. Similarly, content that has been viewed multiple times or that has multiple comments is likely to be more interesting (and, thus, have a higher quality score) for the user than content that has been viewed few times or has few comments. Furthermore, recent content (e.g., indications of recent events or activities) may be more relevant at the present time (and thus have a higher quality score) than older content. The quality score may also be based on a diversification score. For example, the quality score for a content item may be decreased where too many content items having similar features (e.g., content items from the same source or about a similar topic, etc.) exist for display in a stream.

In step 404, a state of each of the items is determined. In one example, information regarding whether an item has been provided for display in a previous session is available. For example, as described above, each session may be associated with a continuation token that identifies all content items provided for display during the session, one or more time stamps associated with the session, and/or other information regarding items displayed during the session.

In one example, state information may include the read/unread state of an item, indicating whether the content item was viewed and/or acted upon by the user. In some aspects, a content item is considered to have been viewed by the user if the user has scrolled past the content item and paused at the content item for at least a predetermined time period (e.g., 2 or 3 seconds), for example, using a tablet computer, laptop computer, or desktop computer. In some aspects, a content item is considered to have been viewed by the user if the user opens the content item (e.g., a photograph or video). In some aspects, a content item is considered to have been viewed by the user if the item was presented to the user for a certain amount of time, providing the user with an opportunity to read the item.

In addition, information may be available that indicate the order in which items were presented to the user in the previous session. In one example, content items already viewed may be stored in a separate data repository and retrieved. In one example, state information is only determined when an item was viewed in a previous session. In one example, an item is only considered as being viewed if it was displayed to the user in one or more sessions (e.g., a specific number of sessions) directly preceding the current session.

In step 405, the one or more items are sorted into a set of buckets. In one example, items are sorted into buckets according to one or more of the quality score and/or state of the item. The first bucket is arranged to have a plurality of content items that are unread (e.g., have not been marked as previously "read") and/or that satisfy a first threshold quality score (e.g., the first N items ranked highest and/or exceeding a threshold score).

The quality score threshold may be a predefined threshold, a specific number of items, or dynamically determined (e.g., based on how many of each of the content items is in each bucket and/or how many items are being presented to the user). The first quality threshold score may be satisfied by exceeding, meeting, or being below a defined score threshold. In one example, a certain "N" number of content items may be placed in one or more of the buckets. The number of items may be a fixed system configured number, a user-specific number, or determined based on various criteria. The criteria may include context information (e.g., the time of day or the day of the week), historical user activity, or other similar criteria.

A second bucket may include the one or more unread items of the plurality of items not provided in another bucket (e.g., first bucket or third bucket). A third bucket may include content items previously presented to the user. In one example, each bucket is sorted. In one example, items within the third bucket are sorted based on the order they were previously presented. While the present example only describes three buckets, it should be apparent to one of ordinary skill in the art that any number of buckets may be used to sort the items.

In one example, the number of items within each bucket may be the same, and/or may vary according to various criteria (e.g., user preferences, historical activity, system configurations, etc.).

In some aspects, the buckets may contain one or more content items that do not meet the state and/or quality score requirements of the bucket. For example, a content item considered to be especially important to the user (e.g., a content item from a person with whom the requesting user has a high affinity, or a content item of an emergency nature, e.g., a breaking news emergency content item) may be included in the first bucket.

At step 406, the one or more content items are provided for display according to the sorting in step 405. In one example, content items from at least the first bucket of content items and the third bucket of content items are provided for display. In one example, items in the first bucket are provided prior to items from the third bucket. In addition the second bucket of items may be displayed. In one example, the items in the second buckets are provided last.

As discussed above, the steps of retrieving content items and organizing them into three buckets may be repeated for a set of content items retrieved per time frame. For example, items may be retrieved for a certain time period and organized into buckets. Another set of content items may then be retrieved for a time period different than the first time period (e.g., a time period prior to the first time period) and organized into buckets. The items are then provided for display according to their time period and/or bucket. For example, all buckets for a first time period are presented in a specific order, next items for a second time period are provided according to a specific order. This process may be repeated as many times as desired until the number of items desirable to be provided by the user has been met.

Figure 5:
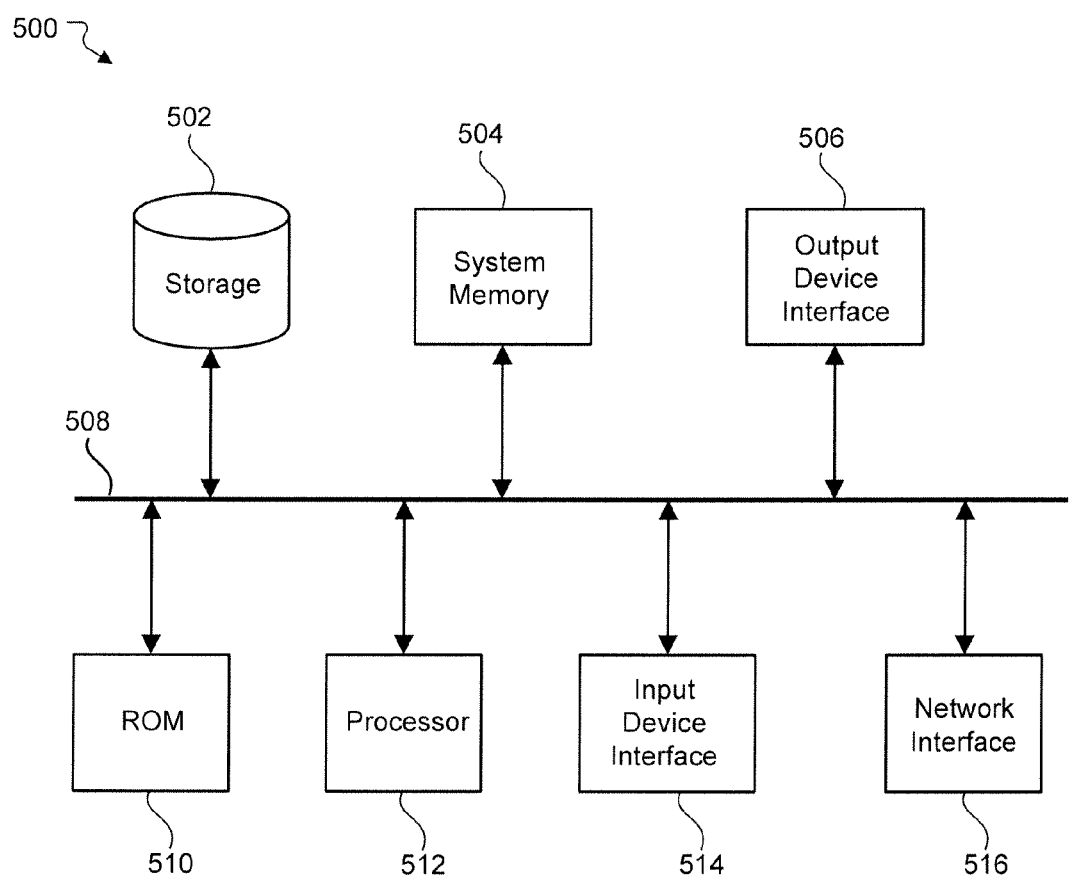
FIG. 5 conceptually illustrates an example electronic system with which some implementations of the subject technology are implemented.

FIG. 5 conceptually illustrates an example electronic system 500 with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for providing content items for display in an information feed, in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers, such as a local area network, a wide area network, or an Intranet, or a network of networks, such as the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

An "aspect" does not imply that such aspect is essential to the subject technology or that such aspect applies to all configurations of the subject technology. A disclosure relating to an aspect may apply to all configurations, or one or more configurations. An aspect may refer to one or more aspects and vice versa. A "configuration" does not imply that such configuration is essential to the subject technology or that such configuration applies to all configurations of the subject technology. A disclosure relating to a configuration may apply to all configurations, or one or more configurations. A configuration may refer to one or more configurations and vice versa.

What is claimed is:

1. A machine-implemented method comprising:
receiving a request for a set of content items within a session;
identifying, in response to the request, one or more content items;
determining, based on a continuation token associated with the session comprising state information regarding each of the one or more content items and a time stamp associated with the session, whether the one or more content items have been previously provided for display;
selecting, for a first bucket, content items of the one or more content items previously provided for display and satisfying a quality score threshold;
selecting, for a second bucket, content items of the one or more content items previously provided for display and not selected for the first bucket;
selecting, for a third bucket, content items of the one or more content items not previously provided for display;
providing content items from the first bucket for display;
providing content items from the third bucket for display; and
providing content items from the second bucket for display, wherein content items from the third bucket are provided after content items from the first bucket and prior to content items from the second bucket.

2. The machine-implemented method of claim 1, wherein the time stamp indicates a time of the request.

3. The machine-implemented method of claim 1, wherein the time stamp indicates a time of the first request within the session.

4. The machine-implemented method of claim 1, wherein the time stamp indicates a time of the session being initiated.

5. The machine-implemented method of claim 1, wherein the information of the continuation token are generated as filter maintaining data corresponding to the content items identified as having been provided for display within the session.

6. The machine-implemented method of claim 1, wherein a termination of the session causes a reset of the continuation token for the session.

7. The machine-implemented method of claim 6, wherein the session is terminated when an indication of the user navigating away from a continuous stream displaying the content items of the session.

8. The machine-implemented method of claim 1, further comprising, storing the information of the continuation token with respect to the session after the session has terminated.

9. A non-transitory machine-readable medium comprising instructions stored therein, which when executed by a system, cause the system to perform operations comprising:
receiving a first request within a session for content items;
identifying one or more content items in response to the first request;
generating a continuation token for the session, wherein the continuation token provides state information regarding each of the one or more content items and a time stamp associated with the session;
determining whether the one or more content items have been previously provided for display;
selecting, for a first bucket, content items of the one or more content items previously provided for display and satisfying a quality score threshold;
selecting, for a second bucket, content items of the one or more content items previously provided for display and not selected for the first bucket;
selecting, for a third bucket, content items of the one or more content items not previously provided for display;
providing content items from the first bucket for display;
providing content items from the third bucket for display;
providing content items from the second bucket for display, wherein content items from the third bucket are provided after content items from the first bucket and prior to content items from the second bucket; and
updating the continuation token with updated state information regarding the content items provided for display and an updated time stamp.

10. The non-transitory machine-readable medium of claim 9, wherein the time stamp corresponds to a time of the first request.

11. The non-transitory machine-readable medium of claim 9, the operations further comprising:
receiving a subsequent request within the session for content items;
identifying a plurality of content items in response to the subsequent request;
determining the information regarding the one or more content items and the time stamp from the continuation token;
determining if one or more of the plurality of content items are different from the one or more content items and has a time that is before the time stamp, based on the information of the continuation token; and
providing the one or more of the plurality of content items for display, if the one or more of the plurality of content items are different from the one or more content items and has a time that is before the time stamp, based on the information of the continuation token, in response to the subsequent request.

12. The non-transitory machine-readable medium of claim 11, the operations further comprising:

updating the continuation token with information regarding the one or more of the plurality of content items.

13. The non-transitory machine-readable medium of claim 11, wherein the one or more of the plurality of content items provided in response to the subsequent request represents a subsequent page of a plurality of pages of a stream of content items.

14. The non-transitory machine-readable medium of claim 9, wherein the one or more content items provided in response to the first request represents a first page of a plurality of pages of a stream of content items.

15. The non-transitory machine-readable medium of claim 9, wherein the termination of the session causes a reset of the continuation token.

16. The non-transitory machine-readable medium of claim 9, wherein selecting, for a first bucket further comprises selecting, for the first bucket, content items of the one or more content items satisfying a first threshold quality score.

17. The non-transitory machine-readable medium of claim 9, determining whether the content item was displayed in the previous session based on the information of the continuation token of the previous session.

18. A system comprising:
one or more processors; and
a machine-readable medium comprising instructions stored therein, which when executed by the processors, cause the processors to perform operations comprising:
receiving a request within a session for content items;
identifying, one or more content items in response to the request;
determining, based on a continuation token associated with the request comprising state information regarding each of the one or more content items and a time stamp associated with the session, whether the one or more content items have been previously provided for display;
selecting, for a first bucket, content items of the one or more content items previously provided for display and satisfying a quality score threshold;
selecting, for a second bucket, content items of the one or more content items previously provided for display and not selected for the first bucket;
selecting, for a third bucket, content items of the one or more content items not previously provided for display;
providing content items from the first bucket for display;
providing content items from the third bucket for display;
providing content items from the second bucket for display, wherein content items from the third bucket are provided after content items from the first bucket and prior to content items from the second bucket; and
updating the continuation token with information regarding the content items provided for display and the time stamp.

19. The system of claim 18, further comprising providing the one or more content items for display if the request is not associated with a continuation token.

20. The machine-implemented method of claim 1, further comprising updating the continuation token with updated state information regarding the content items provided for display and an updated time stamp.

* * * * *